United States Patent [19]

Yuda

[11] Patent Number: 5,351,603
[45] Date of Patent: Oct. 4, 1994

[54] MOUNTING FOR GUIDED CYLINDER AND METHOD

[76] Inventor: Lawrence F. Yuda, P.O. Box 499, Westminster, S.C. 29693

[21] Appl. No.: 109,917

[22] Filed: Aug. 23, 1993

[51] Int. Cl.$^5$ ............................................. F01B 29/00
[52] U.S. Cl. ....................... 92/161; 92/128; 92/165 PR
[58] Field of Search ............. 92/128, 161, 146, 165 R, 92/165 PR

[56] References Cited

U.S. PATENT DOCUMENTS

| | | | |
|---|---|---|---|
| 1,294,787 | 2/1919 | Gilbertson | 92/161 |
| 1,575,185 | 3/1926 | Stenhouse | 92/161 |
| 4,351,628 | 9/1982 | Drexel et al. | 92/165 PR |
| 4,543,034 | 9/1985 | Blatt et al. | 92/161 |
| 4,796,516 | 1/1989 | Horváth | 92/165 R |
| 4,898,080 | 2/1990 | Lieberman | 92/165 PR |
| 5,255,591 | 10/1993 | Gottlieb | 92/165 R |

FOREIGN PATENT DOCUMENTS 2622955 5/1989 France .................................. 92/161

Primary Examiner—Thomas E. Denion
Attorney, Agent, or Firm—Ralph Bailey

[57] ABSTRACT

An apparatus and method for mounting a guided cylinder includes a wall (C) extending between the bore (A) for accommodating the guide rods in the housing and a mounting surface (B). A mounting bore is carried across the wall having an enlarged section for receiving a head (D) of a fastening in a reduced section (E) for receiving in a fastening member.

5 Claims, 2 Drawing Sheets

MOUNTING FOR GUIDED CYLINDER AND METHOD

BACKGROUND OF THE INVENTION

This invention relates to cylinders having guide rods therefor and more particularly to an improved mounting which allows for a housing of reduced size providing miniaturization for the guided cylinder assembly.

Heretofore it has been the practice to pass a mounting bolt entirely through the housing of a guided cylinder in order to secure same to an object upon which the guided cylinder is to be mounted. Because the bolt is passed entirely through the housing it is necessary for the respective bolts to fit securely on one side of each of the guide rods. The additional metal which must be provided in the housing for this purpose increases the size and the weight of the guided cylinder assembly. Guided cylinders in accordance with the prior art are illustrated in U.S. Pat. No. 5,113,746.

SUMMARY OF THE INVENTION

Accordingly, it is an important object of this invention to provide a mounting for a guided cylinder permitting miniaturization by reducing the size of the housing necessary to accommodate mounting bolts and the like.

Another important object of the invention is to provide a mounting for a guided cylinder utilizing a wall, which is formed by a bore in the housing accommodating guide rods, for carrying mounting bolts.

Another object of the invention is to provide an improved method of mounting a guided cylinder wherein the guide rods are each at least partially withdrawn from a bore defining a wall formed by the housing and defined by the bore which receives the respective guide rods. By withdrawing the guide rods, mounting bores in the wall are uncovered for access for the purpose of inserting mounting fasteners. After insertion of the fasteners within the wall, the guide rods and cylinder are again inserted so that the guide rods overlie the fasteners within the wall. A mounting bore may extend across from the wall to facilitate placement of a fastener for reception in the mounting bore. The respective fasteners may be contained in the mounting bores after securement of the fastening means within the member upon which the guided cylinder is to be mounted by respective guide rods after reinsertion thereof.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

The drawings illustrate a guided fluid operated cylinder having an elongated housing carrying a guide rod outside of a sealed cylinder chamber. An elongated bore A is provided in the housing in alignment with the sealed cylinder chamber for mounting the guide rod for sliding movement therein. A mounting surface B is carried on an exterior portion of the housing. An exterior wall C is formed in the housing by the elongated bore and the exterior mounting surface of the housing. A transverse mounting bore extends across the wall between the elongated bore and the mounting surface. The mounting bore has a section D for receiving a head of a fastener having a shank carried thereby. A section E for receiving the shank is formed between the section for receiving the head and the wall C. Thus, the fastener may be placed in the mounting bore when the guide rod is withdrawn leaving an end portion of the shank extending outwardly beyond the mounting surface for mounting the guided cylinder on a mounting member.

Figure 1:
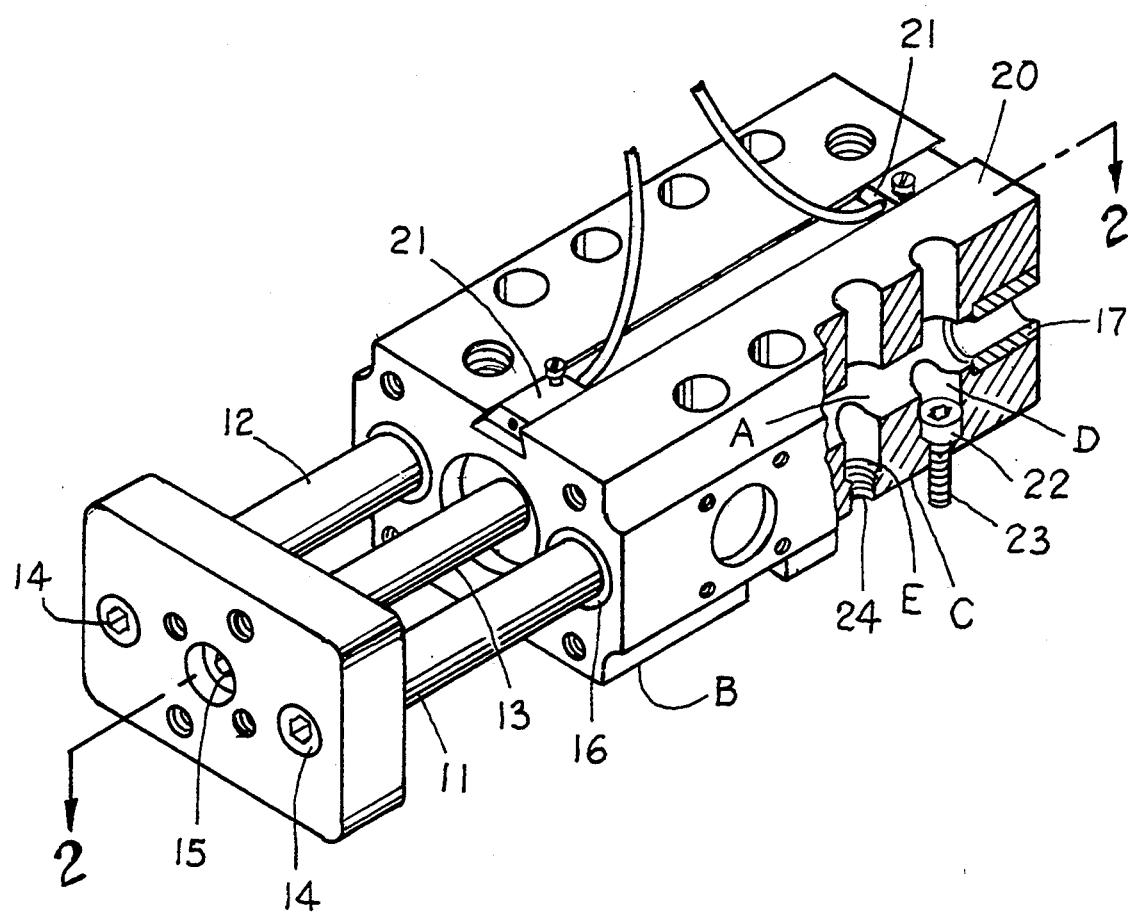
FIG. 1 is a perspective view illustrating a guided cylinder provided with mounting bores bridging a wall which extends from an elongated bore which receives a guide rod and into a mounting member opposite the guide rods.

Referring more particularly to FIG. 1, a cross head member 10 bridges the guide rods 11 and 12 as well as the piston rod 13. The guide rods may be mounted as shown in U.S. Pat. No. 5,113,746, or as illustrated herein, or in accordance with patent Application entitled CYLINDER WITH MOUNTING FOR GUIDE RODS, Serial No. 07/694,060, filed Oct. 21, 1992. It will be observed that suitable end bolts 14 are provided for securing the head 10 to the guide rods while a screw 15 is provided for connecting the cross head member 10 to the piston rod 13.

Figure 2:
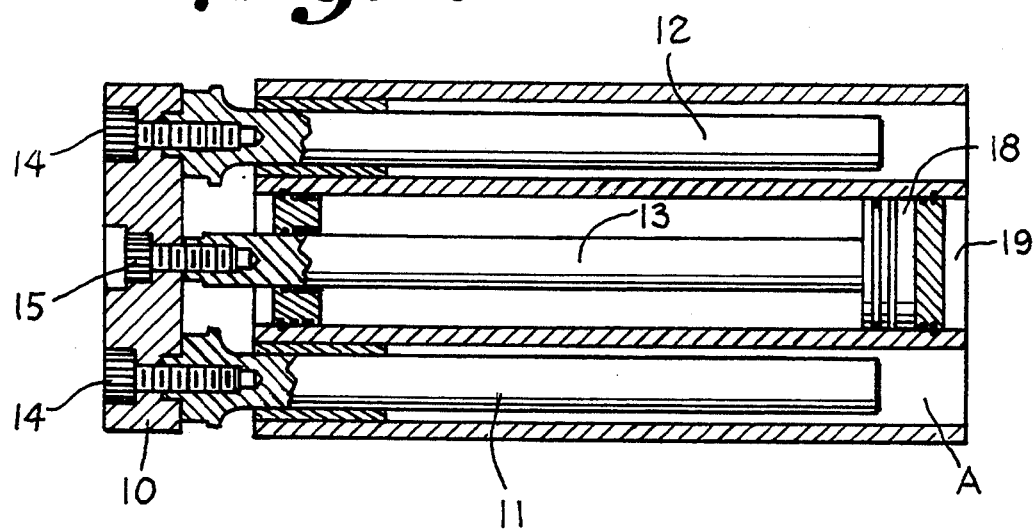
FIG. 2 is a longitudinal sectional elevation taken along the line 2—2 in FIG. 1.
Figure 3:
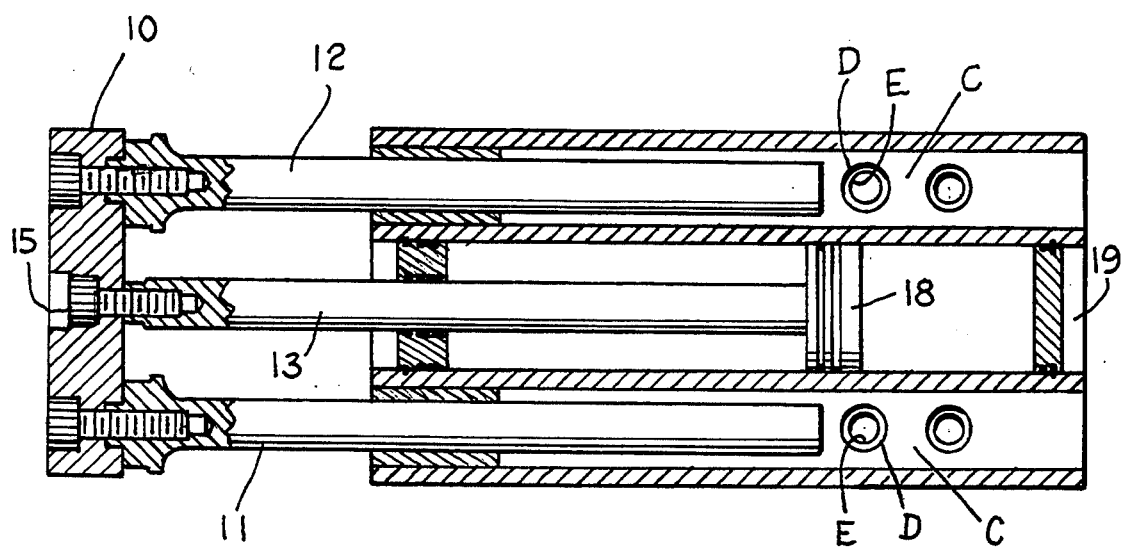
FIG. 3 is a sectional elevation similar to FIG. 2 illustrating the guide rods as being partially withdrawn exposing the mounting bores for receiving fasteners for securement of the guided cylinder upon the mounting member.

It will be observed that bushings 16 and 17 are provided for each of the guide rods in the respective bores A. A suitable piston 18 (FIGS. 2 and 3) may be of the magnetic variety illustrated in U.S. Pat. No. 5,117,743. The end caps 19 may be of the type illustrated in U.S. Pat. No. 4,924,758.

The drawings illustrate a mounting surface B opposite the surface 20 illustrated in FIG. 1 for alignment of the housing of the guided cylinder upon the surface (not shown) upon which the guided cylinder is to be mounted. The guided cylinder is illustrated as carrying adjustable switches 21 which may be constructed in accordance with patent application Ser. No. 07/964,059, filed Oct. 21, 1992. It will be observed that an exterior wall C is formed in the housing by the elongated bore A and the exterior mounting surface of the housing. The wall contains a mounting bore having an enlarged section D to accommodate the head 22 of the fastening member. The fastening member, opposite the head 22 includes a mounting shank 23 which is carried in threads 24 within the section E.

While a preferred embodiment of the invention has been described using specific terms, such description is for illustrative purposes only, and it is to be understood that changes and variations may be made without departing from the spirit or scope of the following claims.

What is claimed is:

1. A guided fluid operated cylinder having an elongated housing carrying a guide rod outside of a sealed cylinder chamber comprising:

an elongated bore in said housing in alignment with said sealed cylinder chamber for mounting said guide rod for sliding movement therein;

a mounting surface on an exterior portion of said housing;

an exterior wall formed in said housing by said elongated bore and said exterior mounting surface of said housing;

a transverse mounting bore extending across said wall between said elongated bore and said mounting surface;

said mounting bore having an enlarged section for receiving a head of a fastener having a shank carried thereby; and an abutment formed between said enlarged section for receiving said head and a reduced section for receiving said shank;

whereby said fastener may be placed in said mounting bore when the guide rod is withdrawn leaving an end portion of said shank extending outwardly of said mounting surface for mounting said guided cylinder.

2. The structure set forth in claim 1 wherein said section for receiving a head of a fastener is an enlarged section and said section for receiving said shank is a reduced section.

3. The structure set forth in claim 1 wherein a pair of guide rods are carried in elongated bores one on each side of said sealed cylinder, a pair of opposed mounting surfaces extending across said elongated bores and said sealed chamber, and a plurality of mounting bores in walls defined by respective elongated bores and mounting surfaces.

4. The structure set forth in claim 1 including an access bore in a wall opposite said mounting bore.

5. The method of mounting a guided fluid operated cylinder having an elongated housing carrying a guide rod outside of a sealed cylinder chamber comprising the steps of:

providing a mounting surface on an exterior portion of said housing;

utilizing a mounting bore extending across a wall between an elongated guide rod bore and said mounting surface for prepositioning a threaded fastener;

prepositioning said threaded fastener by withdrawing said guide rod giving access to said mounting bore;

placing said threaded fastener in said mounting bore;

returning said guide rod to said elongated guide rod bore confining said fastener in said mounting bore; and leaving an end portion of said shank extending outwardly of said mounting surface for mounting said guided cylinder.

* * * * *